United States Patent Office 2,910,081
Patented Oct. 27, 1959

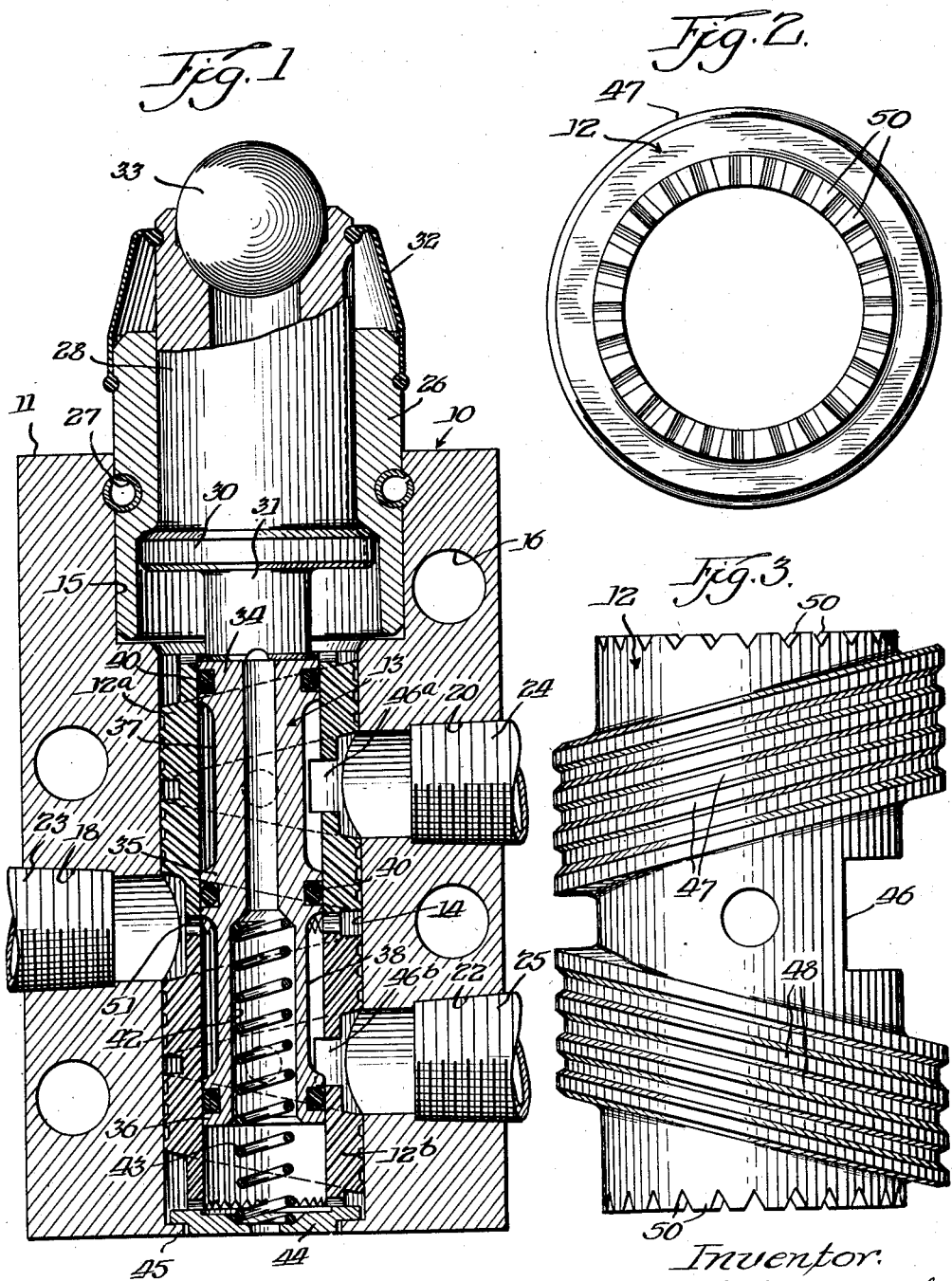

2,910,081
RECIPROCATING VALVE STRUCTURE
Stanley W. Karbowniczek, Chicago, Ill., assignor to Hanna Engineering Works, Chicago, Ill., a corporation of Illinois Application January 30, 1958, Serial No. 712,122
3 Claims. (Cl. 137—625.25)

The invention relates to valve structure such as embodied in multiple port control valves of the reciprocating type and has reference in particular to an improved design of valve sleeve for the reciprocating spool of the valves.

The valve sleeve disclosed in the copending application of John T. Ellis, Jr., Serial No. 712,122, filed January 30, 1958 and entitled Valve Structure consists of two sleeve units of plastic material and which have telescoping relation with the reciprocating spool of the valve. Each sleeve unit is formed with teeth at its respective ends to provide air openings or air passageways when two or more sleeve units are placed end to end in juxtaposition and in addition the said teeth coact to provide bridges, thereby preventing the packing on the reciprocating spool from blowing out of its groove or from being cut or abraded by passing over a sleeve edge when the spool is reciprocated from one of its operative positions to another.

Accordingly, an object of the present invention is to improve the design of sleeve units as disclosed in said application by forming annular ridges on the exterior of the units for sealing with the walls of the valve body and wherein said annular ridges are disposed at an angle to the longitudinal axis. By angularly skewing the ridges in relation to the longitudinal axis of the sleeve units it is possible to utilize much larger air ports than would otherwise be the case while maintaining the valve body and the valve sleeve of the same size and also maintaining the same length of stroke as regards the reciprocating spool.

With these and other objects in view, the invention may consist of certain novel features of construction and operation as will be more fully described and particularly pointed out in the specification, drawings and claims appended thereto.

In the drawings which illustrate an embodiment of the invention, and wherein like reference characters are used to designate like parts:

Figure 1 is a longitudinal sectional view illustrating a multiple port control valve wherein the reciprocating spool thereof is equipped with a valve sleeve embodying the improvements of the invention;

Figure 2 is an elevational view of one end of a sleeve unit as employed in the structure of Figure 1; and Figure 3 is an elevational view of a sleeve unit clearly illustrating the angular skewing of the exterior ridges in a manner conforming to the invention.

Referring to Figure 1, the air valve 10 selected for illustrating the invention comprises a three-way type of reciprocating valve essentially consisting of a valve body 11, the sleeve units 12 and 12b, and the reciprocating spool 13. The valve body is bored vertically to form the bore or passage 14 which extends longitudinally for the full length of the body portion, having a section 15 of enlarged diameter at the top for accommodating actuating means for reciprocating the spool of the valve. The openings 16 allow passage through the valve body 11 of means such as bolts or the like for fastening the valve to a support and said valve body is also provided with a plurality of threaded recesses 18, 20 and 22, each recess extending to and having communication with the bore 14. The recess 20 has threaded therein the inlet conduit 24, whereas recesses 18 and 22 have the control line conduit 23 and outlet conduit 25, respectively, threaded thereto. The inlet conduit 24 supplies air at a pressure to the valve 10 and upon downward reciprocating movement of spool 13, the compressed air is delivered to the control line conduit 23. When the spool is positioned as shown in Figure 1 air is exhausted from the control line to the outlet conduit 25.

For actuating the reciprocating spool 13 the enlarged section 15 of the bore 14 receives the ring member 26 and which is releasably held to the body portion 11 by retaining means such as 27. The ring member accommodates the plunger 28, having the shoulder 30 formed integral therewith, and the said shoulder portion is in turn provided with the depending end 31 of reduced diameter. The plunger 28 and ring member 26 resiliently retain the flexible cover 32 in place, and the top end of the ring member is recessed for receiving the ball 33. For actuating the member 28 to produce reciprocating movements of the spool 13 the ball 33 is contacted by a cam or other operating instrumentality (not shown) and said ball accordingly functions as an anti-friction element to materially reduce friction between the contacting parts.

The reciprocating spool 13 is provided with spaced land portions 34, 35 and 36 and which are spaced by the recessed portions 37 and 38. Each land portion is circumferentially grooved for receiving the packing 40 in the form of a ring which is received by the groove to thereby form a seal for sealing the respective land portion with respect to certain ports of the valve. The spool 13 is also cored upwardly from its bottom end to form the recess 42 and which receives the upper end of the coil spring 43. The base of said coil spring rests upon the bottom plate 44, the said base being releasably retained in place within bore 14 by means of the projecting flanges 45.

The sleeve structure including the sleeve units 12a and 12b has telescoping relation with the reciprocating spool 13 and accordingly the sleeve units fit within the bore 14 and the spool in turn has interfitting relation within said units. Each sleeve unit is preferably formed of plastic having the required strength and flexibility for performing its required function and mention may be made of nylon and Teflon as the type of plastic materials which have proven to be high satisfactory. Also the sleeve structure as disclosed is conveniently formed of a plurality of sleeve units so that upon arranging the units in end to end relation the requirements for either a three-way valve or a four-way valve can be satisfied. Each sleeve unit, approximately midway of its length, as best shown in Figure 3, has a section of its circumferential wall removed to form a port opening 46. The port opening 46a, formed in the sleeve unit 12a, is connected to the inlet conduit 24, whereas the port opening 46b for the unit 12b is connected to outlet 25.

Each end of a sleeve unit is serrated to form teeth such as 50 and which may be described as saw teeth having the outer points thereof flattened to provide flat supporting surfaces. The flat surfaces thus provided by the flattened out points of the teeth 50 give adequate supporting contact when the same are caused to engage each other, as when the sleeve units are placed in end to end relation. Also the contacting teeth of the respective sleeve units coact to form openings 51, or, more particularly, air passageways connecting with the control line conduit 23 and which conduct the air under pressure from the inlet conduit 24 to within the sleeve structure. When the spool 13 is positioned as shown in Figure 1, it will be seen that the inlet conduit 24 is blocked by the spaced land portion 35, the control line being connected to the outlet. Upon downward reciprocating movement of spool 13 the land portion 35 and its respective packing ring 40 will be located below the air passageways 51 and accordingly in this position of the spool the inlet conduit 24 will supply air under pressure to the control line conduit 24.

As best shown in Figure 3 each sleeve unit is provided with exterior, circumferentially extending ridges 47 and 48 which are slightly larger in diameter than the bore 14 so that the sleeve units must be inserted within the bore with a press fit. The pressure resulting from the press fit results in providing an effective seal between the sleeve units and the cylindrical walls of the bore and thus the various ports of the valve are sealed from one another to prevent the leakage of air between the same. Also the press fit securely holds the sleeve units in place within the bore.

In accordance with the invention the annular ridges 47 and 48 are angularly skewed in order to make possible a larger port opening 46 than would otherwise be the case. More specifically, the port opening 46 is located on the right hand side of the sleeve unit 12, as shown in Figure 3. Accordingly, the annular ridges 47 slope downwardly from right to left, with all of the ridges being substantially parallel to each other. The ridges 48 below the port opening 46 are also all parallel to each other but these ridges slope downwardly from left to right, thereby providing a gap of maximum size on the right side of the sleeve unit for accommodating the port opening 46. Thus by angularly skewing the ridges in relation to the longitudinal axis of the sleeve unit it is possible to provide much larger ports for the same size of valve body, for the same size of sleeve unit, and for the same stroke length as regards the reciprocating spool of the valve.

The invention is not to be limited to or by details of construction of the particular embodiment thereof illustrated by the drawings, as various other forms of the device will of course be apparent to those skilled in the art without departing from the spirit of the invention or the scope of the claims.

What is claimed is:

1. In a reciprocating type of valve, in combination, a body portion having a longitudinal bore extending through the same, at least one inlet connection for the body portion and spaced outlet connections for the body portion all having communication with the bore, said inlet and outlet connections being axially spaced along the longitudinal bore and adjacent connections being diametrically opposed, sleeve structure within the bore, said sleeve structure having a plurality of ports formed therein in spaced relation longitudinally of the sleeve and which align respectively with the inlet and outlet connections, exterior ridges encircling said sleeve structure for sealing the sleeve with respect to the walls of the bore, said exterior ridges being angularly skewed with respect to the longitudinal axis of the sleeve structure to accommodate the port openings having a greater length in a longitudinal direction than would otherwise be possible for the same axial spacing of the ports and for the same ridge sealing area, and a valve spool located within the sleeve structure and adapted to reciprocate with respect thereto for selectively connecting the inlet port to certain of the outlet ports.

2. In a reciprocating type valve, in combination, a body portion having a longitudinal bore extending through the same, at least one inlet connection for the body portion and spaced outlet connections for the body portion all having communication with the bore, said inlet and outlet connections being axially spaced along the longitudinal bore and adjacent connections being diametrically opposed, sleeve structure within the bore, said sleeve structure including a plurality of sleeve units each having an intermediate port aligning with one of said connections and having a serrated formation at respective ends, said sleeve units being disposed in end to end relation and said sleeve units having a length whereby the contacting end formations provide port openings in alignment with another of said connections, exterior ridges extending circumferentially of the sleeve unit for sealing the sleeve with respect to the walls of the bore, said exterior ridges being angularly skewed with respect to the longitudinal axis of the sleeve unit to accommodate port openings having a greater length in a longitudinal direction than would otherwise be possible for the same axial spacing of the ports and for the same ridge sealing area, and a valve spool located within the sleeve structure and adapted to have reciprocating movements for selectively connecting certain ports of said sleeve structure with one another.

3. In a reciprocating type valve, in combination, a body portion having a longitudinal bore extending through the same, at least one inlet connection for the body portion and spaced outlet connections for the body portion all having communication with the bore, said inlet and outlet connections being axially spaced along the longitudinal bore and adjacent connections being diametrically opposed, sleeve structure within the bore, said sleeve structure including a plurality of sleeve units each having an intermediate port opening aligning with one of said connections and having a serrated formation at respective ends providing flattened teeth portions, said sleeve units being disposed in end to end relation and said sleeve units having a length whereby respective teeth portions engage to form port openings in alignment with another of said connections, exterior ridges extending circumferentially of each sleeve unit and being disposed above and below the said intermediate port opening therein, said ridges having a press fit within the longitudinal bore to thereby seal the sleeve unit with respect to the walls of the bore, the exterior ridges above the intermediate port opening being angularly skewed in one direction with the ridges below the port opening being angularly skewed in an opposite direction, whereby the sleeve unit is able to accommodate a port opening having a greater length in a longitudinal direction than would otherwise be possible for the same axial spacing of the ports and for the same ridge sealing area, and a valve spool located within the sleeve structure and adapted to have reciprocating movements for selectively connecting certain ports of said sleeve structure with one another.

No references cited.